Aug. 17, 1937.  R. M. URQUHART  2,090,601
METHOD AND APPARATUS FOR EXTINGUISHING FIRES
Filed Nov. 17, 1925
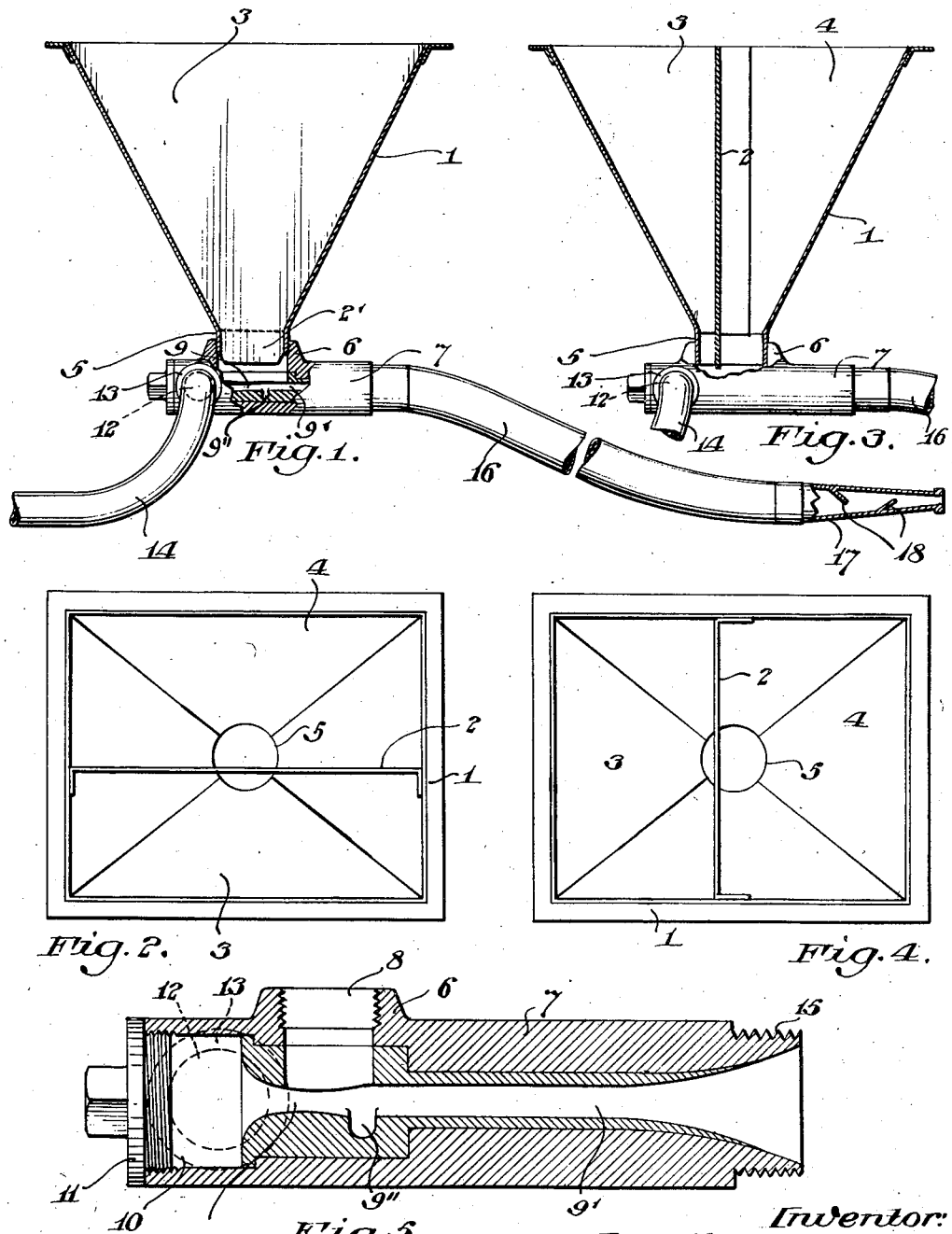
Inventor:
Radcliffe M. Urquhart,
By [signature]
Attorney.

Patented Aug. 17, 1937

2,090,601

UNITED STATES PATENT OFFICE 2,090,601

METHOD AND APPARATUS FOR EXTINGUISHING FIRES

Radcliffe Morris Urquhart, New York, N. Y., assignor to American Foamon Company, Camden, N. J., a corporation of New Jersey Application November 17, 1925, Serial No. 69,559

16 Claims. (Cl. 169—15)

My invention relates to the art of extinguishing or checking combustion by blanketing the combustible material with a stable foam preventing access of oxygen to the fire, which is thereby smothered.

My improvements involve the production and delivery of foam by flowing water from a source of continuous supply toward the point of discharge of the foam and simultaneously and continuously introducing into the flowing water, in advance of the point of discharge, and in proportion substantially constant with respect to each other and in proper ratio to the rate of water supply, a foam stabilizer and gas-generating reagents in solid form and in quantities requisite to produce a mixture of foam and undissolved particles of such reagents, so that foam is formed when some of each reagent has been dissolved in the water and has reacted with the other reagent, and passing the resulting mixture through a pipe or hose to effect, simultaneously, the transportation of foam to a point of discharge and the dissolving and reaction in transit through the pipe or hose of undissolved particles.

My invention further provides a method and apparatus for producing a constant supply of smothering foam without the losses resulting from deterioration of mixtures of foam forming materials or the diminution of the foam volume by transmission through long passages after formation. Further objects of my invention are to minimize back pressure at the place of introduction of foam-forming materials and to eliminate necessity for large supply tanks or special pipe lines.

Foam-forming powders heretofore used, such as mixtures of sodium bicarbonate, aluminum sulphate and liquorice extract, tend to deteriorate and lose their effervescent properties as a result of reactions between the ingredients and hydration thereof by absorption of atmospheric or other moisture. Moreover, when such mixtures are kept absolutely dry and supplied to a flowing stream of solvent therefor, the formation of foam occurs so quickly that it tends to create a back pressure at the place of introduction of the foam-forming powder and the resulting foam is substantially reduced in volume by frictional contact with the walls of the discharge hose, which is required to be of substantial length to permit free movement thereof without interfering with the apparatus for introducing the powder.

In accordance with my invention, a fire-smothering foam is formed by feeding into a flowing solvent a plurality of substances, preferably powdered, which when dissolved in the solvent coact therewith and with each other to form a stable foam, with which the fire is blanketed. The foam-forming substances coact with one another to form foam only when in solution, and a solution of any of the substances is in itself substantially non-frothing or "still". But when the gas-generating reagents in solid form and in proportion substantially constant with respect to each other are introduced into flowing water in proper ratio to the rate of water supply or when solutions of such reagents are united, active effervescence takes place, and the films of the resulting bubbles are toughened by a suitable stabilizer, preferably supplied to the solvent with one of the foam-forming substances.

The foam-forming substances are preferably introduced under the influence of atmospheric pressure into the flowing solvent stream by suction resulting from the flow thereof through an ejector, Venturi tube, or the like. The rapid flow of the solvent removes the sucked in particles from the place of introduction before substantial dissolution thereof occurs, hence no substantial formation of foam or back pressure occurs at the place of introduction. As, however, the powders dissolve and the solutions thereof combine foaming takes place gradually, with maximum foaming preferably adjacent to the outlet or nozzle. When the distance to be traversed between the powder ejectors and nozzle is long, the foam-forming substances are preferably so fed that the solutions form substantially parallel contacting streams, which further retards the formation of the bulk of the foam. To insure ultimate mixture of the solutions and formation of foam, a baffle or mixing device may be provided adjacent to the outlet or nozzle.

The substances used for the formation and stabilization of foam are preferably such as are readily soluble in water, and the ingredients employed in any particular locality will be dependent upon the cost and supply thereof and the character of fire to be combatted. Ordinarily it is most advantageous to use powdered aluminum sulphate as one of the foam-forming substances, sodium bicarbonate as the other of the foam-forming substances, and a dry secondary-extract of liquorice as the foam stabilizer. Preferably about sixty parts by weight of aluminum sulphate are used to thirty-five parts of sodium bicarbonate and five parts of liquorice extract, the latter being preferably mixed with the sodium bicarbonate. Many other foaming and stabilizing ingredients may, however, be used without departing from my invention.

The accompanying drawing illustrates, somewhat diagrammatically, apparatus suitable for the practice of my improved method.

In the drawing, Fig. 1 is a longitudinal sectional view of an ejector having connected therewith inlet and discharge conduits and means for feeding foam forming substances separately thereto; Fig. 2 is a top plan view of the apparatus shown in Fig. 1; Fig. 3 is a longitudinal sectional view of the apparatus with the hopper turned transversely to its position in Fig. 1; Fig. 4 is a top plan view of a hopper with the partition positioned transversely to the length thereof; and Fig. 5 is an enlarged longitudinal sectional view of the ejector.

As illustrated in Figs. 1, 2, 3, and 5 of the drawing, a hopper 1 is provided with the longitudinal partition 2, forming therein receptacles 3 and 4 converging to a funnel shaped section 5 screwed into the seat 6 of an ejector body 7. The partition 2 is preferably provided with a tongue 2' to divide the ejector inlet 8, which communicates with the longitudinal bore having a constricted section 9, a larger flaring section 9', and a pocket 9''. The bore section 9' communicates at its inner end with a chamber 10 having its end closed by a removable plug 11 and provided with a lateral inlet 12 through a threaded boss 13 for the connection of a supply hose 14. The opposite end of the ejector body is provided with a coupling thread 15 for the connection of a delivery hose 16 provided with a nozzle 17 containing mixing baffles 18. The receptacles are preferably made of different capacities to accommodate the proper proportions of the different foam-forming ingredients required, and the inlets from the receptacle to the ejector bore are so proportioned as to feed the proper relative amounts of foam-foaming chemicals.

In the practice of my invention, the ejector body is connected with supply and discharge hose sections and a stream of water forced therethrough. The receptacles 3 and 4 are supplied respectively with powdered alum or the like and with a mixture of powdered sodium bicarbonate and liquorice extract or the like. The suction of the stream flowing through the ejector draws from the receptacles proper proportions of foam-forming ingredients which are rapidly drawn away from the place of introduction by the flow of the stream before complete dissolution. Due to the parallel feeding of the ingredients, the solutions formed thereby mix but slowly in their flow through the discharge hose, with gradual formation of foam which is discharged through the nozzle upon the fire or combustible material. The baffles in the nozzle effect an intimate mixture of the foam-forming solution before the discharge thereof from the nozzle, so that the maximum quantity of foam is delivered to the fire or combustible material.

As illustrated in Fig. 4, the partition 2 is shown disposed in the hopper 1 transversely to the direction of flow through the ejector 7, so that the chemicals contained in the receptacles 3 and 4 are fed separately to the flowing water but across the entire width of the stream, so that upon the dissolution of the powders there is a quicker reaction between the solutions and formation of foam, which may be desirable where the discharge hose section is short.

It will thus be observed that by merely turning the hopper in its seat, I am able to retard or accelerate the formation of the bulk of the foam so as to secure maximum efficiency whether a long or short discharge hose is used.

Having described my invention, I claim:

1. The method of extinguishing fire which consists in feeding separately a plurality of dry powdered substances of different chemical content from external sources and separately inert into a flowing solvent therefor at substantially the same locus, said substances being maintained inert until contact is had with said solvent and forming when combined therewith a stable foam, and blanketing a fire with the foam.

2. The method of forming a fire smothering foam which comprises flowing a stream of liquid under pressure through an ejector and creating suction thereby, drawing separately into said stream at substantially the same locus by the suction created by said stream, a plurality of powders of different chemical content soluble therein and forming when combined therewith a stable foam, said substances being maintained inert until contact is had with said solvent.

3. The method of extinguishing fire which comprises drawing a soluble separately inert powder into a flowing stream of solvent therefor, separately drawing into the same stream at substantially the locus of introduction of the first named powder further separately inert powders soluble therein and of different chemical content from said first named powder, flowing the portions of said stream containing the powder first named and the powders second named as substantially separate currents a sufficient distance from the point of introduction of the powders to retard complete admixture and the formation of foam, said currents uniting to form stable foam at a distance from the point of introduction of the powders sufficient to avoid substantial back pressure at such point of introduction.

4. The apparatus for extinguishing fires which comprises an ejector and means for feeding foam forming ingredients separately to said ejector, said means being adjustable to accelerate or retard the mixing of said foam forming ingredients.

5. The method of producing and delivering foam which consists in continuously flowing water from a source of supply toward the point of discharge of the foam, simultaneously and continuously introducing into the flowing water in advance of the point of discharge and in proportions substantially constant with respect to each other and also with respect to the rate of water supply, a foam stabilizer and acid and basic gas-generating reagents in solid form, and in quantities requisite to produce a mixture of foam and undissolved particles of said reagents, so that foam is formed when some of each reagent has been dissolved in the water and has reacted with the other, and passing the resulting mixture through a pipe or hose to effect, simultaneously, the transportation of the foam to a point of discharge and the dissolving and reaction in transit through the hose of undissolved particles.

6. The apparatus for extinguishing fires, which comprises an ejector, a hopper communicating therewith through a throat and a diaphragm in the hopper separating it into two chambers and extending into the throat to form inlets to the ejector of different cross-sectional area.

7. A method of producing and delivering foam which consists in flowing water from a source of continuous supply toward the point of discharge of the foam, simultaneously and continuously introducing into a suction-creating jet formed by the flowing water in advance of the point of discharge, a foam stabilizer and gas-generating reagents in solid form from an external source and under the influence of atmospheric pressure and in quantities requisite to produce a mixture of foam and undissolved particles of said reagents so that foam is formed when some of each reagent has been dissolved in the water and has reacted with the other, and passing the resulting mixture through a tube to effect simultaneously the transportation of the confined foam to a point of discharge and the dissolving and reaction in transit through the tube of undissolved particles.

8. The method of producing and delivering foam which includes flowing water from a source of continuous supply toward the point of discharge of foam and jetting the water to create suction during such transit and concurrently introducing into the jetted water by the action of such suction and atmospheric pressure undissolved soluble foam-generating substances, including foam stabilizer, having substantially constant foam-forming proportions to one another, and dissolving such substances in such flowing water to thereby create tenacious foam and delivering such foam to the point of use.

9. The method of producing and delivering foam which includes flowing water from a source of continuous supply toward the point of discharge of foam and jetting the water to create suction during such transit, and concurrently introducing into the jetted water by the action of such suction and atmospheric pressure undissolved soluble foam-generating substances, including foam stabilizer, to form streams flowing toward the point of foam discharge and each containing a substance aforesaid to provide solutions each of which is substantially non-frothing, and uniting the solutions to produce active effervescence and the formation of bubbles having films toughened by the action of the stabilizer to form a tenacious foam, and delivering such foam to the point of use.

10. In the production of fire extinguishing foam, the steps which include entraining in jetted water creating suction particles of undissolved soluble gas-foaming solid reagents and stabilizer from an external source and under the influence of atmospheric pressure, and confining and flowing the aqueous water and its entrained material during gradual interaction of such water and its entrained material to form stable fire smothering foam.

11. In the production of fire extinguishing foam, the steps which include concurrently supplying under the influence of atmospheric pressure uninterrupted flow of particles of gas-forming soluble undissolved reagents in solid form and foam stabilizer to flowing jetted water creating suction and flowing the intermixed water, reagents and stabilizer in confinement under pressure during the dissolution of such reagents and the production therefrom of gas in such water as the surface tension and viscosity are changed by the diffusion of such stabilizer and thereby forming tenacious persistent foam capable of smothering fire.

12. A method of producing and delivering foam which consists in flowing water from a source of continuous supply toward the point of discharge of the foam, jetting the flowing water to create suction, entraining in the jetted water foam stabilizer and particles of undissolved soluble gas-forming solid reagents from an external source and under the influence of atmospheric pressure, and confining the flow of the resulting mixture under pressure during the conversion of gas-forming reagents into gas and the formation of tenacious bubbles by the action of the gas on the stabilizer-treated water.

13. The method of producing and delivering foam which consists in flowing water from a source of supply toward the point of discharge of foam and jetting the water to create suction during such transit, concurrently introducing into the jetted water, in advance of the point of foam discharge and under the influence of such suction and atmospheric pressure, foam stabilizing material and a plurality of coacting gas-generating reagents in solid form and in quantities requisite to produce a mixture of foam and undissolved particles of said reagents so that foam is formed when some of each reagent has been dissolved in water and has reacted with the other, and confining and flowing the resulting mixture under pressure during the conversion of gas-generating reagents into gas and the formation thereby of tenacious bubbles from the stabilizer-treated water, and discharging the resulting foam from confinement at a point remote from the introduction of the reagents into the jetted water.

14. The method of producing and delivering foam which consists in flowing water from a source of continuous supply toward the point of discharge of the foam and concurrently and continuously introducing into the flowing water, in advance of the point of discharge, and in proportion substantially constant with respect to each other and in proper ratio to the rate of water supply, a plurality of separately inert gas-forming ingredients from separate external sources of supply and a foam stabilizer, and confining under pressure in the same tube the water containing both said ingredients and stabilizer, said ingredients being fed in quantities requisite to produce in such tube a mixture of foam and undissolved particles so that foam is formed when some of each ingredient has been dissolved in water and has reacted with the other, the conversion of the bulk of the ingredients into solutions taking place during their confinement.

15. Apparatus for extinguishing fire which comprises a hopper, an ejector to which foam-forming ingredients are discharged from said hopper, a tube supplying water to said ejector, a tube connected with the outlet from said ejector and confining the flow until the bulk of the foam-forming ingredient have reacted to form foam, and means for retarding or accelerating the formation of the bulk of the foam relative to the length of said last named tube.

16. The method of forming foam which consists in concurrently pouring, from independent bodies of granular separately inert chemicals, separate streams thereof into a solvent combining with said chemicals to form foam, one of said streams including a foam stabilizer.

RADCLIFFE MORRIS URQUHART.